United States Patent [19]

Antekeier et al.

[11] Patent Number: 4,726,599

[45] Date of Patent: Feb. 23, 1988

[54] MUDFLAP BRACKET

[75] Inventors: Steven A. Antekeier, North Shores; Leonard A. Gould, Fruitport; Louis E. Eklund, Muskegon, all of Mich.

[73] Assignee: Fleet Engineers, Inc., Muskegon, Mich.

[21] Appl. No.: 840,901

[22] Filed: Mar. 17, 1986

[51] Int. Cl.[4] .............................................. B62D 25/18
[52] U.S. Cl. ............................................. 280/154.5 R
[58] Field of Search ................. 280/154.5 R, 154.5 A, 280/153, 154, 152, 163, 169; 248/214, 340

[56] References Cited

U.S. PATENT DOCUMENTS

| | | | |
|---|---|---|---|
| 1,094,134 | 4/1914 | Dickerson | 280/154 |
| 2,683,612 | 7/1954 | Bacino | 280/154.5 R |
| 3,224,791 | 12/1965 | Sogoian | 280/154.5 R |
| 3,700,260 | 10/1972 | Moore et al. | 280/154.5 R |
| 3,837,672 | 9/1974 | Molby | 280/154.5 R |
| 3,899,193 | 8/1975 | Evans | 280/154.5 R |
| 3,934,901 | 1/1976 | Hammerly | 280/154.5 R |
| 4,165,092 | 8/1979 | Herlein | 280/154.5 R |
| 4,326,727 | 4/1982 | Rock | 280/154.5 R |

OTHER PUBLICATIONS

Shortened Mud Flap Holders by Betts, Betts Spring Company, Inc., 2100 Williams Street, San Leandro, Calif. 94577.
Standard Mud Flap Holders, Betts Spring Company, Inc., 2100 Williams Street, San Leandro, Calif. 94577.
Off-Set Mud Flap Holders, Betts Spring Company, Inc., 2100 Williams Street, San Leandro, Calif. 94577.
Shortie Brackets, Fleet Engineers, 1800 E. Keating Ave., Muskegon, Mich. 49442, pp. 303-13 through 303-16.
Flap Brackets, Fleet Engineers, 1800 E. Keating Ave., Muskegon, Mich. 49442, pp. 303-9 through 303-12.

Primary Examiner—David M. Mitchell
Attorney, Agent, or Firm—Varnum, Riddering, Schmidt & Howlett

[57] ABSTRACT

A mudflap assembly (10) mounts a mudflap (14) onto a vehicle frame. The mudflap assembly (10) includes a downwardly extending mudflap. The mudflap (14) is suspended from a support bar (16) and provides spray suppression. A bracket member (18) secures the mudflap (14) to the support bar (16). The bracket member (18) has an end flap (22) which extends downwardly from the bracket member (18) to conceal an outer end of the support bar (16) from view. The bracket member (18) can also include a crimped portion (23) at an inner end thereof for limiting vertical movement of the bracket member (18) relative to the support bar (16).

6 Claims, 5 Drawing Figures

MUDFLAP BRACKET

BACKGROUND OF THE INVENTION

1. Field of the Invention

This invention relates to a mudflap assembly and, more particularly, a bracket for securing a mudflap to a support bar which is, in turn, secured to a vehicle frame.

2. Background of the Invention

Mudguards, or mudflaps, are used primarily behind dual rear wheel truck and trailer vehicles. Because the trucks may go at great speeds and heavy mud may be thrown up against the mudflap at a great force, the mudflaps provide spray suppression effects to protect the vision of trailing vehicles. Further, the mudflaps may be mandated by federal, state or local requirements.

Mudflaps made of a textured material may collect mud, snow, slush, or the like within the textured surface of the mudflap. The weight of the mudflap is thereby drastically increased. The mudflaps may, due to the increased weight, pull or tear free of the brackets used to secure the mudflap to the support bar. This tearing or ripping tends to occur at the discrete points where the mudflap is fastened to the bracket.

An example of a mudflap assembly is shown in the patent to Herlein U.S. Pat. No. 4,165,092, issued Aug. 21, 1979. The Herlein Patent, while directed to the bracket mounting the support bar to the vehicle frame, discloses a support bar and mudflap.

SUMMARY OF THE INVENTION

According to the invention, a mudflap assembly is provided for mounting to a vehicle frame. The mudflap assembly has a downwardly-extending mudflap suspended from a support bar for spray suppression. A tubular bracket member is positioned around the support bar and means are provided for securing the tubular bracket member to the mudflap. An end flap extends downwardly from the bracket member so as to conceal an outer end of the support bar from view, thereby increasing the visual esthetics of the mudflap assembly. Further, means on the bracket member located beneath the support bar is adapted to limit the vertical movement of the bracket with respect to the support bar.

The end flap preferably has an under-turned portion extending beneath the support bar so as to further secure the end flap in place at an outer end of the support bar. The under-turned portion is preferably secured to the support bar by a weldament.

The movement-limiting means preferably comprises a crimped portion of the bracket located beneath the support bar. Preferably, the crimped portion is located at an inner portion of the bracket member.

In a preferred embodiment of the invention, the tubular bracket member has a pair of depending flat portions and the mudflap is positioned between the flat portions. The securing means comprises a plurality of fasteners extending through the flat portions and the mudflap, and compressing the mudflap between the flat portions so as to provide continuous support for the mudflap along the bracket.

By supporting the mudflap continuously along the upper edge thereof, the tendency of the mudflap to tear at discrete points where the mudflap is secured to the support bar is diminished because the discrete points of support are eliminated. This clamping action, therefore, increases the life of the mudflap.

BRIEF DESCRIPTION OF THE DRAWINGS

The invention will now be described with reference to the drawings in which.

DETAILED DESCRIPTION OF THE DRAWINGS

Figure 1:
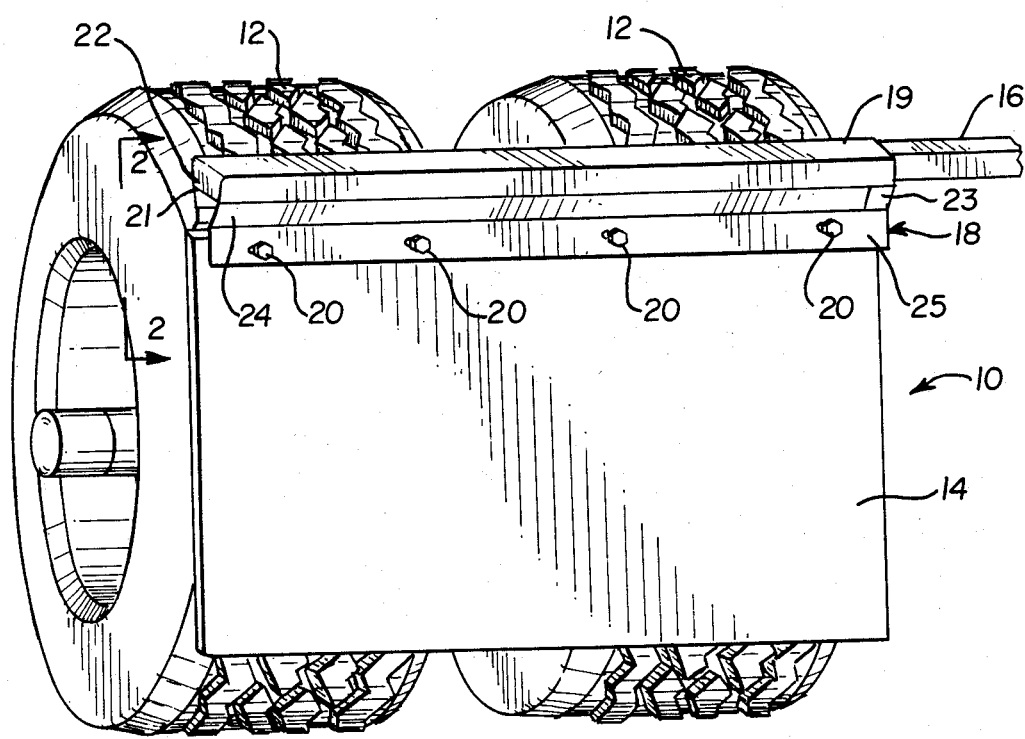
FIG. 1 is a perspective view of a mudflap assembly according to the invention.

With reference to the drawings, and in particular, with reference to FIG. 1, a dual rear wheel assembly 12 is shown. The dual rear wheel assembly 12 is adapted for use on a tractor (not shown) of the type used in conjunction with commercial trailers. A mudflap assembly 10 is mounted rearward of dual rear wheel assembly 12 to shield following traffic from spray generated by the wheels 12 and to satisfy federal, state, or other safety regulations which may require the use of mudflaps. In use, a mudflap 14 is disposed on either side of the tractor so that a mudflap 14 is located at the rear of wheels 12 on either side of the vehicle. The mudflap assemblies 10 on either side of the vehicle are mirror images, and one mudflap assembly 10 will be described herein unless otherwise noted.

Mudflap assembly 10 comprises a mudflap 14 suspended from a support bar 16. Support bar 16 is, in turn, secured to the vehicle frame (not shown) through conventional mounting bracket (not shown). Mudflap 14 can be a textured, synthetic material adapted to provide optimum spray supression. The material of mudflap 14 can have a nap (not shown). This nap provides excellent spray suppression. The nap, however, tends to retain mud, slush, and ice, increasing the weight of mudflap 14.

Support bar 16 extends horizontally, parallel to the ground from the vehicle frame. Support bar 16 is secured to the vehicle frame at an inward portion thereof and extends outwardly from the vehicle frame to support mudflap 14. Support bar 16 is located rearward of dual rear wheel assembly 12.

A generally tubular, inverted U-shaped bracket 18 having a bight portion 19 is mounted on support bar 16 for attaching mudflap 14 to support bar 16. Bracket 18 ensheaths support bar 16 so that bight portion 19 rests upon and is supported by support bar 16. Sides 21 of bracket 18 extend downwardly on either side of support bar 16. An end flap 22 extends outwardly from bight portion 19 and is down-turned. End flap 22 is turned inwardly at an end thereof so that end flap 22 wraps around an end of support bar 16 to protect support bar 16 from view and to present a pleasing visual appearance.

The sides 21 of bracket 18 have sloped portions 24 beneath support bar 16. Crimped portions 23 are formed beneath support bar 16 at an inner end thereof to prevent bracket 18 from riding upward on support bar 16. Crimped portions 23 thereby act to secure bracket 18 to support bar 16 and to limit vertical movement of bracket 18 with respect to support bar 16.

Figure 4:
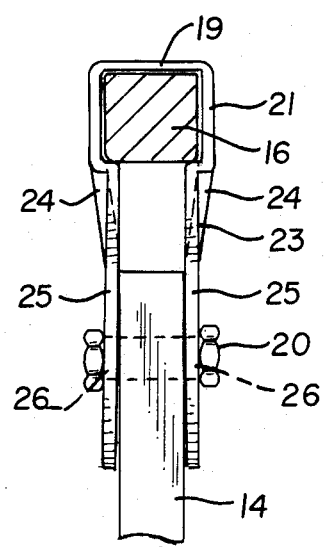
FIG. 4 is a side, sectional view taken along line 4—4 of FIG. 3.

As may be seen in FIG. 4, crimped portion 23 extends inwardly and downwardly from side 21. Flat portions 25 extend downwardly beneath from crimped portion 23 and sloped portion 24. Flat portion 25 is adapted to provide a flat surface for gripping an upper portion of mudflap 14.

Figure 2:
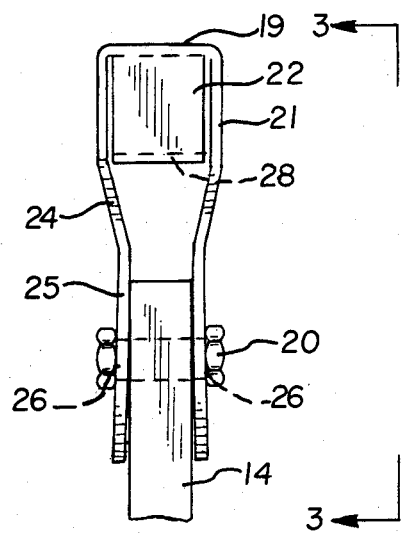
FIG. 2 is a partial end view taken along line 2—2 of FIG. 1.

As can be seen in FIG. 2, flat portions 25 have apertures 26 extending therethrough which are oblong in shape to provide dimensional tolerance and are adapted to receive fasteners 20. The innermost fastener 20 has been removed in FIG. 3 so that aperture 26 may be seen clearly. Fasteners 20 extend through the apertures 26 and through the upper portion of mudflap 14 so as to secure mudflap 14 to bracket 18. Fasteners 20 are bolts or rivets adapted to draw flat portions 25 together so that flat portions 25 grip the upper portion of mudflap 14. The mudflap 14 is thereby supported by both the fasteners 20 passing through mudflap 14 at discrete points and also by the gripping action of flat portions 25 along the upper edge of mudflap 14. The gripping action of the flat portions 25 along the upper edge of mudflap 14 prevents mudflap 14 from tearing free of fasteners 20 even where the weight of mudflap 14 is drastically increased due to embedded mud, slush, or other road debris within the textured material of mudflap 14.

Figure 3:
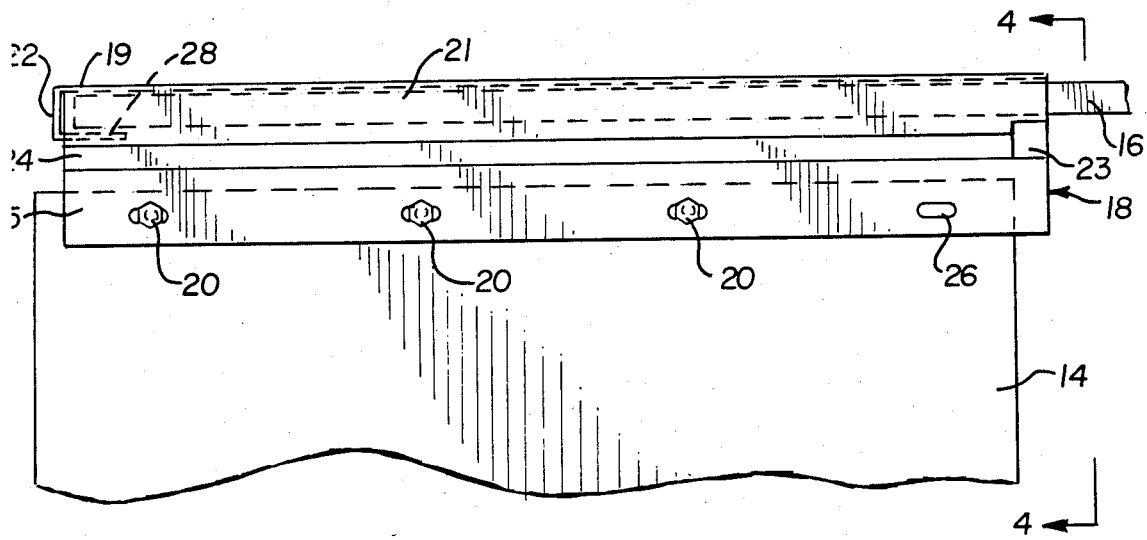
FIG. 3 is a partial side view taken along line 3—3 of FIG. 2.

As may further be seen in FIG. 3, end flap 22 extends downwardly and terminates at an under-turned portion 28 which extends inwardly beneath support bar 16. Thus, end flap 22 covers the end of support bar 16 so as to present a pleasing visual appearance and to avoid jagged edges on which clothing might catch. Under-turned portion 28 can be welded to support bar 16. Crimped portion 23 prevents the fatigue failure of end flap 22 and also prevents the failure of the weldament used to secure under-turned portion 28 to support bar 16 by limiting vertical movement of bracket 18 with respect to support bar 16.

Figure 5:
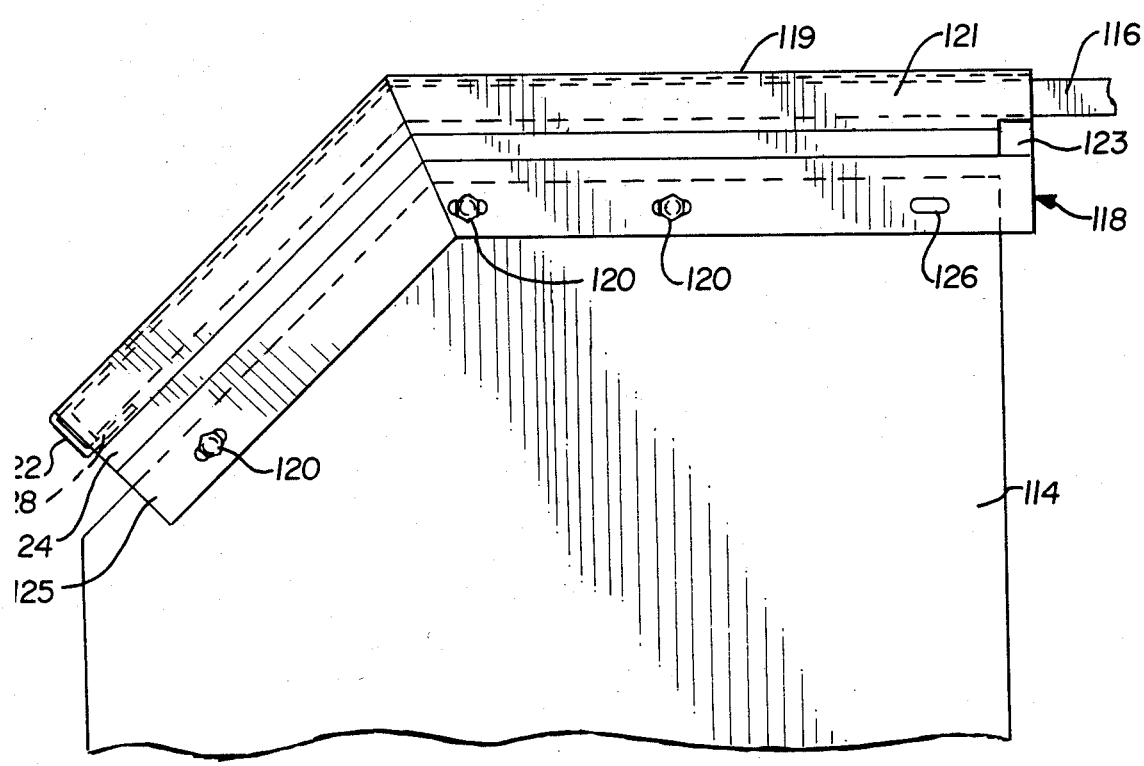
FIG. 5 is a partial elevational view of a second embodiment of the invention.

As may be seen in FIG. 5, the invention may be adapted for use with an angled support bar 116. For convenience, three digit reference numerals are used to identify portions of the embodiment shown in FIG. 5. The second and third digits of these reference numerals correspond to the reference numerals identifying corresponding portions of the embodiment of the invention shown in FIGS. 1–4.

In this embodiment, bracket 118 is notched and bent downwardly so that an outer end of bracket 118 extends at a downward angle so as to accommodate angled support bar 116. A weldament is placed at the notched location in bracket 118 so as to form the continuous bracket shown in FIG. 5. In use, bracket 18 is placed on support bar 116, and under-turned portion 128 of end flap 122 is welded to support bar 116. Crimped portions 123 are then pressed or pinched at an inner end of bracket 118 to enclose support bar 116. A mudflap 114 contoured at an upper portion thereof to correspond to angled support bar 116 is then inserted between flat portions 125. Fasteners 120 are then inserted in oblong apertures 126 and through the upper portion of mudflap 114 so as to tighten flat portions 125 against mudflap 114. Mudflap 114 is thereby secured within mudflap bracket 118 so as to present a pleasing visual appearance without the hazard of mudflap 114 tearing free of fasteners 120 at the locations of discrete fasteners 120. Instead, flat portions 125 support mudflap 114 along the length of mudflap 114.

While particular embodiments of the invention have been shown, it will be understood that the invention is not limited thereto and reasonable modifications and variations are possible without departing from the spirit of the invention.

The embodiments of the invention in which an exclusive property or privilege is claimed are defined as follows:

1. In a mudflap assembly for mounting a mudflap onto a vehicle frame, said mudflap assembly having a downwardly-extending mudflap suspended from a support bar for spray-supression, the improvement comprising:

a U-shaped tubular bracket member having an upper bight portion and substantially parallel, spatially separated side flanges depending downwardly therefrom and positioned around said support bar;

means for securing said tubular bracket member to said mudflap; and an end flap integral with said bight portion and extending vertically downwardly from said bracket member so as to conceal an outer end of said support bar from view, thereby increasing the visual aesthetics of said mudflap assembly wherein said end flap further comprises an integral horizontal portion at a lower portion thereof, said horizontal portion extending beneath said support bar so as to further secure said end flap in place at an outer end of said support bar.

2. A mudflap assembly according to claim 1 wherein said horizontal portion is secured to said support bar by a weldament.

3. A mudflap assembly according to claim 2 wherein said bracket member further comprises a limiting means adapted to limit vertical movement of said bracket relative to said support bar, thereby reducing wear and fatigue of said bracket.

4. A mudflap assembly according to claim 3 wherein said limiting means comprises a crimped portion of said side flanges located beneath said support bar.

5. A mudflap assembly according to claim 4 wherein said crimped portion is located at an inner portion of said bracket member.

6. A mudflap assembly according to claim 5 wherein said mudflap is positioned between said side flanges, and said securing means comprises a plurality of fasteners extending through said side flanges and said mudflap and compressing said mudflap between said side flanges.

* * * * *